US012645004B2

US 12,645,004 B2

(12) United States Patent
Martire et al.

(10) Patent No.: US 12,645,004 B2
(45) Date of Patent: Jun. 2, 2026

(54) DEEP LEARNING-BASED GRAVITATIONAL WAVE DETECTION

(71) Applicant: Applied Physics, Inc., New York, NY (US)

(72) Inventors: Gianni Martire, New York, NY (US); Michael Andrews, Pittsburgh, PA (US); Manfred Paulini, Pittsburgh, PA (US); Luke Sellers, Denver, CO (US); Alexey Bobrick, Malmö (SE); Haydn Kirk Vestal, Austin, TX (US)

(73) Assignee: Applied Physics, Inc., New York, NY (US)

( * ) Notice: Subject to any disclaimer, the term of this patent is extended or adjusted under 35 U.S.C. 154(b) by 0 days.

(21) Appl. No.: 19/007,511

(22) Filed: Jan. 1, 2025

(65) Prior Publication Data

US 2025/0138217 A1      May 1, 2025

Related U.S. Application Data

(63) Continuation of application No. PCT/US2023/026858, filed on Jul. 3, 2023.

(Continued)

(51) Int. Cl.
| | |
|---|---|
| *G01V 7/06* | (2006.01) |
| *G06N 3/0464* | (2023.01) |
| *G06N 3/09* | (2023.01) |

(52) U.S. Cl.
CPC ............. *G01V 7/06* (2013.01); *G06N 3/0464* (2023.01); *G06N 3/09* (2023.01)

(58) Field of Classification Search
CPC . G01V 7/06; G01V 7/00; G01V 7/005; G01V 1/00; G06N 3/0464; G06N 3/09;

(Continued)

(56) References Cited

U.S. PATENT DOCUMENTS

| | | | | |
|---|---|---|---|---|
| 5,646,728 A | * | 7/1997 | Coutsomitros | .......... G01H 9/00 |
| | | | | 356/519 |
| 2014/0096606 A1 | * | 4/2014 | Patti | ......................... G01V 7/08 |
| | | | | 73/382 R |
| 2017/0276827 A1 | * | 9/2017 | Gulian | ..................... G01V 7/10 |

FOREIGN PATENT DOCUMENTS

| | | | | | |
|---|---|---|---|---|---|
| CA | 3204983 A1 | * | 7/2022 | ............. | G01V 1/003 |
| CN | 106781891 A | * | 5/2017 | ............. | G09B 23/06 |

(Continued)

OTHER PUBLICATIONS

Soni, Siddharth, et al. "Discovering features in gravitational-wave data through detector characterization, citizen science and machine learning." Classical and Quantum Gravity 38.19 (2021): 195016.

(Continued)

*Primary Examiner* — Jeffrey P Aiello
(74) *Attorney, Agent, or Firm* — Cognition IP, P.C.; Edward Steakley

(57) ABSTRACT

Systems and methods describe providing deep learning-based detection of gravitational waves. In one embodiment, the system: trains a deep learning classifier using a first set of waveform data from GW detectors; applies the trained deep learning classifier to a second set of waveform data to identify candidate GW signals; generates an SNR ranking statistic from the output of the trained deep learning classifier; determines SNR rankings of the candidate GW signals using the generated SNR ranking statistic; evaluates the compatibility between candidate GW signals from different detectors by comparing arrival times and parameters of the candidate GW signals; estimates a plurality of detection significance scores associated with the candidate GW signals by analyzing clusters of identified candidate GW signals that pass or fail the compatibility evaluation; and outputs at least a subset of the identified GW signals based on their SNR rankings and detection significance scores.

17 Claims, 6 Drawing Sheets

GRAVITATIONAL
WAVE DETECTORS
140

100

WAVEFORM DATA
REPOSITORY
130

CANDIDATE SIGNAL
REPOSITORY
132

SIGNAL-TO-NOISE
RATIO RANKING
REPOSITORY
134

CLIENT DEVICE
150

PROCESSING ENGINE
102

Related U.S. Application Data

(60) Provisional application No. 63/357,998, filed on Jul. 1, 2022.

(58) Field of Classification Search
CPC ............ G06N 3/045; G06N 3/08; G06N 3/02; G06N 3/042; G06N 3/0499; G06N 20/00; G06N 5/022
USPC .......... 73/597; 702/72, 179, 1, 2, 15, 18, 79, 702/66, 96, 71
See application file for complete search history.

(56) References Cited

FOREIGN PATENT DOCUMENTS

| | | | | | |
|---|---|---|---|---|---|
| CN | 112607055 | A | * | 4/2021 | |
| CN | 114330012 | A | | 4/2022 | |
| RU | 2748132 | C1 | * | 5/2021 | ........... G01V 1/3808 |

OTHER PUBLICATIONS

International Search Report and Written Opinion of International Search Authority in international application No. PCT/US2023/026858, mailed on Dec. 13, 2023.

* cited by examiner

200

102

PROCESSING ENGINE

TRAINING MODULE
202

CLASSIFIER MODULE
204

RANKING STATISTIC
MODULE
206

RANKING MODULE
208

COMPATIBILITY MODULE
210

SIGNIFICANCE MODULE
212

OUTPUT MODULE
214

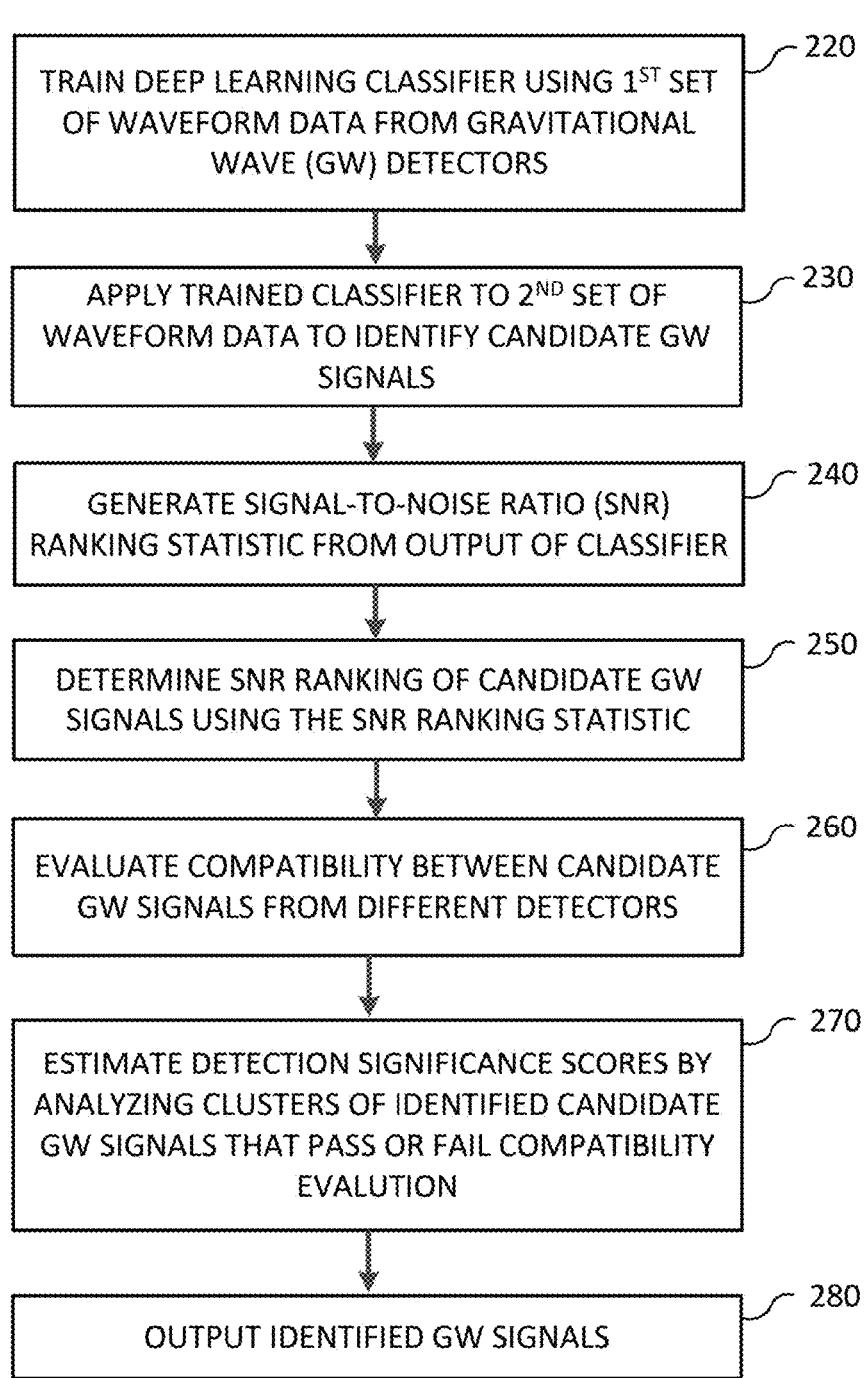

TRAIN DEEP LEARNING CLASSIFIER USING 1ST SET OF WAVEFORM DATA FROM GRAVITATIONAL WAVE (GW) DETECTORS — 220

APPLY TRAINED CLASSIFIER TO 2ND SET OF WAVEFORM DATA TO IDENTIFY CANDIDATE GW SIGNALS — 230

GENERATE SIGNAL-TO-NOISE RATIO (SNR) RANKING STATISTIC FROM OUTPUT OF CLASSIFIER — 240

DETERMINE SNR RANKING OF CANDIDATE GW SIGNALS USING THE SNR RANKING STATISTIC — 250

EVALUATE COMPATIBILITY BETWEEN CANDIDATE GW SIGNALS FROM DIFFERENT DETECTORS — 260

ESTIMATE DETECTION SIGNIFICANCE SCORES BY ANALYZING CLUSTERS OF IDENTIFIED CANDIDATE GW SIGNALS THAT PASS OR FAIL COMPATIBILITY EVALUTION — 270

OUTPUT IDENTIFIED GW SIGNALS — 280

FIG. 2B

| Data set | Start time (GPS time) | Duration (hours) | Entries ($10^3$) |
|---|---|---|---|
| Training | 1126297600 | 6.6 | 48 |
| Validation | 1126400000 | 4.4 | 32 |
| Test, start | 1126785024 | 12.1 | 87 |
| Test, mid | 1131302912 | 12.1 | 87 |
| Test, end | 1136578560 | 12.1 | 87 |

FIG. 3

DEEP LEARNING-BASED GRAVITATIONAL WAVE DETECTION

CROSS-REFERENCE TO RELATED APPLICATIONS

This application is a continuation of international application no. PCT/US2023/026858, filed Jul. 3, 2023, which claims the benefit of U.S. provisional application No. 63/357,998, filed Jul. 1, 2022, which are hereby incorporated by reference in their entirety.

FIELD OF INVENTION

The present invention relates generally to gravitational wave detection, and more particularly, to systems and methods for providing deep learning-based detection of gravitational waves.

SUMMARY

The appended claims may serve as a summary of this application.

BRIEF DESCRIPTION OF THE DRAWINGS

The present disclosure will become better understood from the detailed description and the drawings, wherein:

FIG. 2B is a flow chart illustrating an exemplary method that may be performed in some embodiments relating to deep learning-based gravitational wave detection.

FIG. 3 is a table illustrating an example of a number of datasets used for training the deep learning classifier.

DETAILED DESCRIPTION

Figure 1:
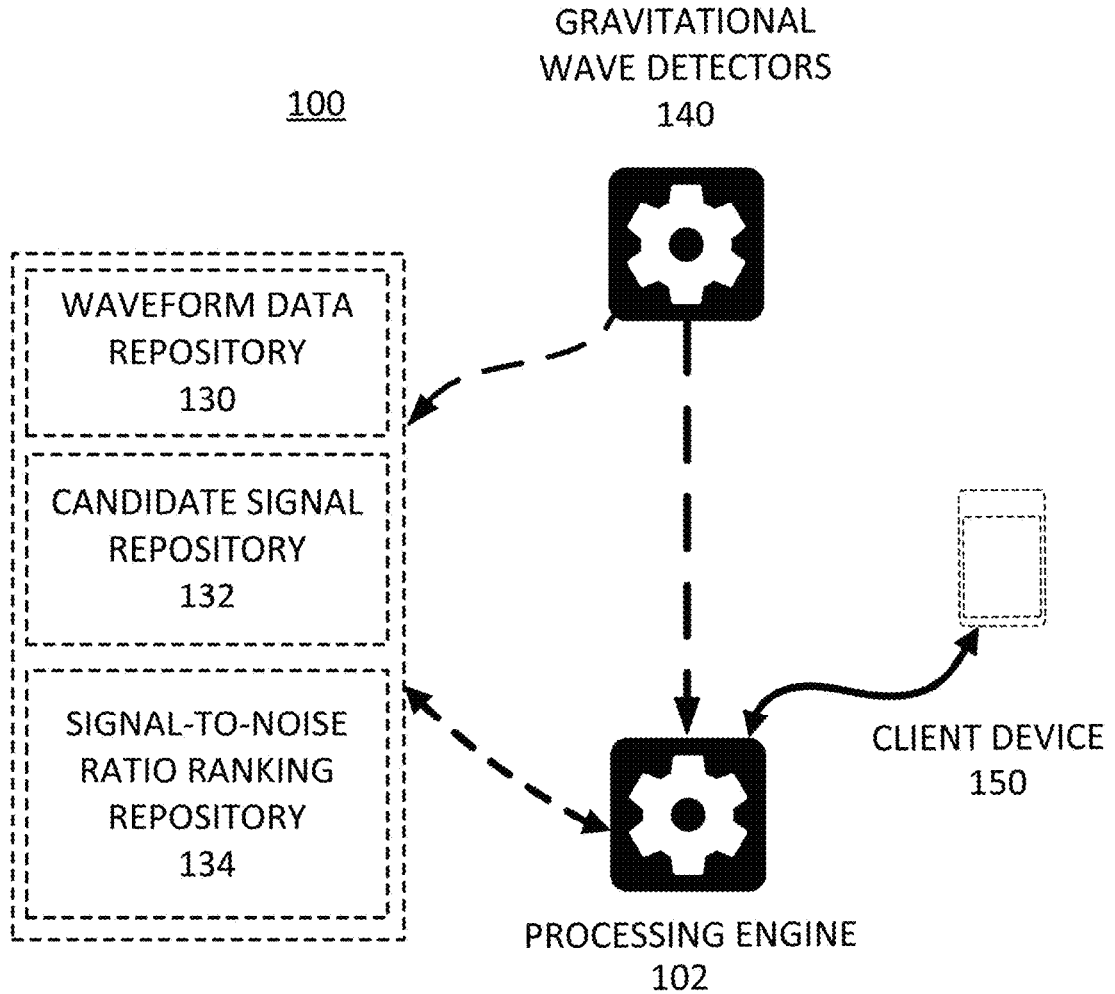
FIG. 1 is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

All scientific claims of gravitational wave (hereinafter "GW") discovery to date rely on the statistical analysis of candidate observations in order to quantify significance relative to background processes. The current foundation in such detection pipelines in experiments at the Laser Interferometer Gravitational-Wave Observatory (hereinafter "LIGO") is the matched-filter algorithm (hereinafter "MF algorithm"), which produces a signal-to-noise ratio-based statistic for ranking candidate observations. With GW detectors like LIGO, glitches are the dominant noise source affecting detection pipelines, all of which are based on the MF algorithm. Because of this, GW-detection pipelines typically require extensive glitch mitigation, as current GW discoveries would not have been possible without them. The MF algorithm is also computationally expensive. In an MF-based workflow or scan, each slice of LIGO strain data must be compared against a large multidimensional GW template bank representing waveforms described by all of the possible parameters that determine the dynamics of a GW source. In practice, it is infeasible to probe the full parameter space that describes the dynamics of most GW sources, which further reduces the ultimate sensitivity achievable with an MF-based workflow.

By contrast, in a machine learning (hereinafter "ML")-based workflow, each slice of the strain data needs to be evaluated only once, making it feasible to train the ML classifier on the full GW parameter space and run the classifier in real time. Real-world applications of ML-based GW classification have thus centered on real-time detection to enable, for instance, multimessenger astronomy.

Most of the promising ML results in GW detection are only usable for real-time detection in their current form because they do not offer a framework for significance quantification with the same level of rigor as MF-based detection pipelines. This is largely because current GW ML classifiers output a probability score, whereas "offline", non-real-time detection pipelines require a signal-to-noise ratio (hereinafter "SNR")-type detection statistic that only the MF algorithm provides to date. A SNR statistic tends to separate the distribution of signal-like outliers from those of noise sources, making a distribution in the SNR statistic straightforward to statistically analyze for significance quantification. On the other hand, the probability score of an ML classifier tends to compress the distribution of signal-like outliers, thereby obscuring their separation from a distribution of noise sources. Although this does not make statistical analysis of a probability score distribution impossible, it makes analysis highly cumbersome. Moreover, because of finite float precision, the compression in the distribution of the probability score can cause GW candidates with very high probability scores to be truncated, making their statistical analysis impossible. As a result of this, existing deep learning-based attempts to detect GWs are not easily integrated into discovery workflows, limiting the use of deep learning to non-discovery-oriented applications.

Thus, there is a need in the field of gravitational wave detection to create a new and useful system and method for providing deep learning-based detection of gravitational waves. The source of the problem, as discovered by the inventors, is a lack of a deep learning-based ability to perform detection of GWs in order to make integration with existing detection pipelines feasible and straightforward, and a lack of definition of a detection statistic that can be used to build an ML-based pipeline for identifying GW signal candidates in a discovery-oriented workflow. In some embodiments, such a system and method would also enable a fully ML-based detection pipeline that uses the deep learning-based detection as a backbone and does not require the MF algorithm. In some embodiments, this deep-learning based detection is offline in nature, while in other embodiments, it is real-time in nature.

In some embodiments, a deep learning-based signal-to-noise ratio detection pipeline is introduced, which generates a signal-to-noise ratio ranking statistic from deep learning classifiers, to provide the foundation needed for deep learning algorithms to be used in discovery-oriented pipelines for the first time. In some embodiments, the performance of this pipeline may be demonstrated by identifying binary black hole (hereinafter "BBH") merger candidates versus noise sources in waveform data from multiple GW detectors, such as, for example, open LIGO data. For example, high-fidelity simulations of LIGO detector responses may be used to present the first sensitivity estimates of deep learning models in terms of physical observables. In some embodiments, the robustness and results of such a pipeline enable it to be usable in the scientific discovery of gravitational waves and rare signals in broader contexts, potentially enabling the detection of fainter signals and never-before-seen phenomena.

In one embodiment, the system: trains a deep learning classifier using a first set of waveform data from a first number of GW detectors; applies the trained deep learning classifier to a second set of waveform data from a second number of GW detectors to identify candidate GW signals; generates an SNR ranking statistic from the output of the trained deep learning classifier; determines SNR rankings of the candidate GW signals using the generated SNR ranking statistic; evaluates the compatibility between candidate GW signals from different detectors by comparing arrival times and parameters of the candidate GW signals; estimates a plurality of detection significance scores associated with the candidate GW signals by analyzing clusters of identified candidate GW signals that pass or fail the compatibility evaluation; and outputs at least a subset of the identified GW signals based on their SNR rankings and detection significance scores.

Further areas of applicability of the present disclosure will become apparent from the remainder of the detailed description, the claims, and the drawings. The detailed description and specific examples are intended for illustration only and are not intended to limit the scope of the disclosure.

FIG. 1 is a diagram illustrating an exemplary environment in which some embodiments may operate. In the exemplary environment 100, a client device 150 is connected to a processing engine 102. The processing engine 102 is optionally connected to gravitational wave detectors 140, and optionally connected to one or more repositories and/or databases, including, e.g., a waveform data repository 130, a candidate signal repository 132, and/or a signal-to-noise ratio ranking repository 134. One or more of the databases may be combined or split into multiple databases. The client device 150 in this environment may be a computer, and the processing engine 102 may be applications or software hosted on a computer or multiple computers which are communicatively coupled via remote server or locally.

The exemplary environment 100 is illustrated with only one client device and one processing engine, though in practice there may be more or fewer additional client devices and/or processing engines. In some embodiments, the client device(s) and/or processing engine(s) may be part of the same computer or device.

In an embodiment, the processing engine 102 may perform the exemplary method of FIG. 2 or other method herein and, as a result, provide deep learning-based detection of gravitational waves. In some embodiments, this may be accomplished via communication with the client device, processing engine, GW detectors, and/or other device(s).

The client device 150 is a device capable of sending and receiving data. In some embodiments, the client device is a computing device capable of hosting and executing one or more applications or other programs capable of capturing, sending and/or receiving data. In some embodiments, the client device may be a computer desktop or laptop, tablet, mobile phone, or any other suitable device capable of sending and receiving information.

In some embodiments, optional repositories can include a waveform data repository 130, a candidate signal repository 132, and/or a signal-to-noise ratio ranking repository 134. The optional repositories function to store and/or maintain, respectively, waveform data from multiple GW detectors (e.g., training and/or non-training data); candidate signals identified by a trained deep learning classifier; and SNR rankings for candidate signals. The optional database(s) may also store and/or maintain any other suitable information for the processing engine 102 or securities marketplace 140 to perform elements of the methods and systems herein. In some embodiments, the optional database(s) can be queried by one or more components of system 100 (e.g., by the processing engine 102), and specific stored data in the database(s) can be retrieved.

The GW detectors 140 are scientific instruments designed to detect and measure GWs. The detectors employ various technologies and principles to measure minute changes in distances and other physical properties induced by GWs. In various embodiments, the gravitational wave detectors 140 may be, e.g., one or more of: laser interferometers (e.g., LIGO), pulsar timing arrays, space-based detectors (e.g., Laser Interferometer Space Antenna or "LISA"), resonant mass detectors, atomic interferometers, electromagnetic detectors, quantum squeezing enhanced detectors, or any other relevant types of GW detectors employing different technologies and techniques to detect and measure the effects of gravitational waves.

Figure 2A:
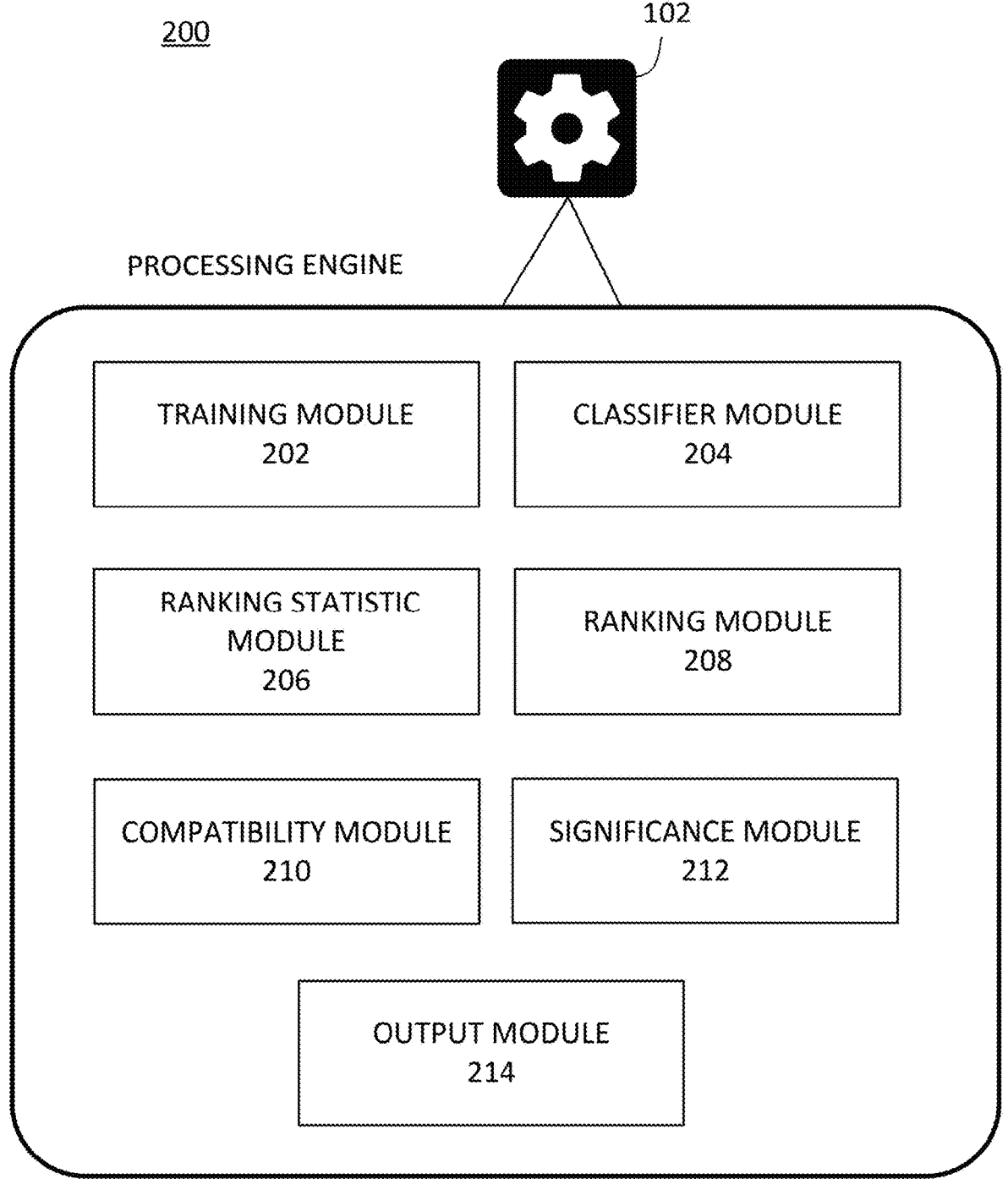
FIG. 2A is a diagram illustrating an exemplary computer system that may execute instructions to perform some of the methods herein relating to deep learning-based gravitational wave detection.

FIG. 2A is a diagram illustrating an exemplary computer system 200 with software modules that may execute instructions to perform some of the methods herein relating to deep learning-based detection of GWs. In some embodiments, the modules illustrated are components of the processing engine 102.

Training module 202 functions to train a deep learning classifier using a first set of waveform data from a first number of gravitational wave (GW) detectors.

Classifier module 204 functions to apply the trained deep learning classifier to a second set of waveform data from a second number of GW detectors to identify candidate GW signals.

Ranking statistic module 206 functions to generate an SNR ranking statistic from the output of the trained deep learning classifier.

Ranking module 208 functions to determine SNR rankings of the candidate GW signals using the generated SNR ranking statistic.

Compatibility module 210 functions to evaluate the compatibility between candidate GW signals from different detectors by comparing arrival times and parameters of the candidate GW signals;

Significance module 212 functions to estimate a number of detection significance scores associated with the candidate GW signals by analyzing clusters of identified candidate GW signals that pass or fail the compatibility evaluation.

Output module 214 functions to output at least a subset of the identified GW signals based on their SNR rankings and detection significance scores.

The above modules and their functions will be described in further detail in relation to an exemplary method below.

FIG. 2B is a flow chart illustrating an exemplary method that may be performed in some embodiments relating to tokenization of IP securities.

At step 220, the system trains a deep learning classifier (sometimes referred to herein as "the classifier") using a first set of waveform data from a first number of GW detectors (sometimes referred to herein as simply "detectors"). This deep learning classifier is trained to be able to recognize and distinguish gravitational wave signals from background noise using data obtained from multiple GW detectors. In some embodiments, multiple GW detectors are deployed at different locations to enhance sensitivity and enable better localization of the GW sources.

In some embodiments, a large dataset consisting of labeled waveform data is used to train the classifier. The first set of waveform data from the first number of GW detectors is used as this training dataset. These waveforms represent the measured strains, i.e., changes in length caused by gravitational waves. In some embodiments, the data from multiple detectors may provide various pieces of information about each of the waveform signals, including their arrival times, amplitudes, and potential correlations.

In some embodiments, training the deep learning classifier with data from multiple detectors enables the classifier to capture the unique characteristics and signatures of gravitational wave signals that may be detected by different detectors. Each detector has its own attributes, e.g., noise characteristics, instrumental effects, and response functions, all of which contribute to the overall training data. By using data from multiple detectors, the classifier can learn to differentiate true gravitational wave signals from detector-specific artifacts and background noise.

In some embodiments, training the deep learning classifier involves using a large dataset of simulated GW signals with realistic detector response. Such simulated signals may be specifically designed to mimic the characteristics and behavior of real gravitational waves, and they are generated considering the realistic response of the gravitational wave detectors. In some embodiments, simulated signals are used to generate a large training dataset that covers a wide array of scenarios and signal variations. By incorporating realistic detector responses into the simulations, the training process can capture the intricacies and complexities of the actual detector output when encountering gravitational wave events.

In some embodiments, the dataset includes a combination of both simulated gravitational wave signals and real data collected from GW detectors. This hybrid dataset is used to provide a comprehensive set of representative examples for training the classifier to accurately identify and analyze GW events. Incorporating real data into the training dataset allows it to capture the characteristics and nuances of GW signals that are present in the operational environment and in real-world scenarios. In various embodiments, this may include, for example, the effects of noise, instrument artifacts, and environmental factors that can impact the detector readings. The simulated GW signals, meanwhile, can allow for a systematic training based on different signal types and scenarios accounting for a wide range of parameters, such, e.g., waveform shapes, frequencies, and signal-to-noise ratios, which may not be readily available or sufficiently represented in the real data by itself.

In some embodiments, the dataset is curated, and includes labeling of GW signals. This curation may include careful selection and annotation of examples of GW signals. In some embodiments, labeling of the GW wave signals involves assigning specific annotations or tags to each signal, indicating its presence and characteristics. In some embodiments, these labels may be prepared manually by one or more researchers or other persons knowledgeable in identifying and classifying GW signals. In various embodiments, the labels may include such information as, e.g., waveform shapes, frequencies, time-domain strains, and other relevant characteristics of the signals.

In some embodiments, labeled background samples are also included in the dataset. These background samples represent data that does not contain GW signals but may instead include, e.g., noise, instrumental artifacts, or other spurious events. Labeling the background samples allows the deep learning classifier to learn the distinguishing features between true gravitational wave signals and noise, enhancing its ability to discriminate between signal and background during the detection process and thereby reducing false positives in identification.

In some embodiments, the deep learning classifier is based on a convolutional neural network (hereinafter "CNN"). CNNs are particularly well-suited for extracting signals from waveforms due to the translational symmetry of GW signals in waveform data. In some embodiments, the classifier is specifically based on a residual neural network (hereinafter "ResNet") CNN. Within the ResNet CNN, residual blocks are employed to overcome the performance degradation associated with increased the model depth of the neural network. For example, by introducing skip connections that bypass some layers, the residual blocks enable the gradient flow to propagate more effectively during training, thus improving the ability of the classifier to learn intricate representations of gravitational wave signals.

In some embodiments, the first set of waveform data is first processed by normalizing and standardizing the waveform data to enhance the performance of the deep learning classifier. This processing step aims to enhance the performance of the deep learning classifier by ensuring that the input data is in a suitable format and distribution. In some embodiments, the normalization process involves scaling the waveform data to a common range or distribution. The input data may have varying magnitudes or scales, which can affect the learning process of the deep learning classifier. By normalizing the data, all features within the waveform data can be adjusted to a consistent scale, thus allowing the classifier to learn from the data more effectively. Common normalization techniques include, for example, min-max scaling, where the values are rescaled to a specified range (e.g., between 0 and 1), or z-score normalization, where the data is transformed to have a mean of 0 and a standard deviation of 1. In some embodiments, the waveforms are processed through a band-pass filter (for example, a band-pass filter between 16 Hz and 2 kHz), and then processed through a notch filter (for example, at 60, 120, and 180 Hz), which can remove resonances associated with the detector power supplies. In some embodiments, further band-pass filtering may be performed to select only frequencies where the power density in the signal is expected to be above detector noise levels. In some embodiments, standardization is employed to transform the waveform data to have a standard normal distribution. In some embodiments, this involves scaling the resulting strain values by a sample-wide constant so that the sample-wide root-mean-square ("RMS") is approximately unity.

In some embodiments, the system processes the first set of waveform data into time-domain waveform strains to be used as training data for the deep learning classifier. In some embodiments, the use of native time-domain waveform strains as inputs results in a significant sensitivity advantage over frequency-domain inputs. In some embodiments, to convert the continuous waveform strains to fixed-length arrays suitable for training, the system applies a sliding window over selected and processed time segments. For example, a window with a duration of 1 second and a stride of 0.5 seconds may be used. In some embodiments, this selection of stride length ensures that every point in the source waveform appears twice in the training sample, or once if near a segment boundary. This ensures that at least one of the two extracted waveforms will not be near the edge of the array.

FIG. 3 is a table illustrating an example of a number of datasets used for training the deep learning classifier. The total number of samples selected in each data set is illustrated in the rightmost column marked "Entries". In this particular example, Gravitational Wave Open Science Center ("GWOSC") datasets are used for training data, which corresponds to data collected by the H1 and L1 detectors at LIGO during a particular data-taking period.

Returning to FIG. 2B, in some embodiments, this processing involves combining time-domain inputs from multiple detectors to improve the accuracy of signal identification. In some embodiments, combining time-domain inputs from multiple detectors can be performed by aligning and synchronizing the data from each detector. This alignment ensures that the data points correspond to the same time instances, facilitating the merging of the signals. The combined data, representing the GW signal from multiple detectors, can provide a more robust and reliable input to the deep learning classifier for signal identification.

In some embodiments, the processing of the waveform data involves accounting for variations in detector arrival times to improve the accuracy of signal identification. The arrival times of GW signals at different detectors can vary due to factors such as, e.g., the distance between detectors and the orientation of the wave source. By accounting for these variations in arrival times, the method can more accurately align the waveform data from different detectors, enabling a more precise comparison and analysis of the signals. This alignment can ensure that the corresponding data points from each detector align in time, thereby facilitating the detection and identification of GW signals. In some embodiments, to account for the variations in arrival times, one or more techniques such as, e.g., time shifting or time correction may be employed. These methods adjust the timing of the waveform data from each detector to compensate for the differences in arrival times.

In some embodiments, the deep learning classifier is trained using transfer learning techniques. In some embodiments, employing transfer learning techniques to train the classifier allows for leveraging pre-existing knowledge from a pre-trained supervised classifier. In some embodiments, an unsupervised deep learning classifier can be trained to detect GWs of unknown signal type by using the features learning from the pre-trained supervised classifier.

In some embodiments, training the deep learning classifier comprises minimizing the binary cross-entropy loss between a GW signal, such as, e.g., a binary black hole (hereinafter "BBH") signal, and background samples using an adaptive moment estimation (hereinafter "Adam") optimizer, i.e., an optimization algorithm often used in deep learning applications. The Adam optimizer dynamically adapts the learning rate for each parameter based on their past gradients. This allows the optimizer to automatically adjust the step size for each parameter. In some embodiments, during the training process, the Adam optimizer iteratively updates the model's parameters based on the gradients computed from the binary cross-entropy loss function. The loss function quantifies the discrepancy between the predicted probabilities of the samples being BBH signals or background samples and their corresponding true labels. By minimizing the binary cross-entropy loss, the optimizer adjusts the model's weights and biases to improve its ability to distinguish between BBH signals and background samples.

In some embodiments, the deep learning classifier is trained using a loss function that encourages the identification of rare or faint gravitational wave signals, which may be more challenging to detect. In some embodiments, a modified loss function is utilized during the training process. The loss function is designed to assign higher penalties or weights to misclassifications of rare or faint gravitational wave signals compared to misclassifications of more prominent or common signals. By assigning greater importance to the accurate identification of rare events, the classifier is trained to prioritize their detection and minimize false negatives.

At step 230, the system applies the trained deep learning classifier to a second set of waveform data from a second number of GW detectors to identify candidate GW signals. This process expands the application of the deep learning classifier beyond the initial training dataset and enables the identification of GW signals in a different set of waveform data.

In some embodiments, the second set of waveform data may be obtained from a separate group of GW detectors; in other embodiments, at least some of the GW detectors used to obtain the training waveform data are used to obtain this second set of waveform data. In some embodiments, at least some of the detectors may have different characteristics, locations, or orientations compared to the detectors used to obtain the training data.

In some embodiments, the second set of waveform data is first preprocessed by normalizing and standardizing the waveform data to enhance the performance of the deep learning classifier. This process is similar to the normalization and standardization processes described above with respect to the training waveform data.

In some embodiments, prior to applying the classifier, the system processes the second set of waveform data into time-domain waveform strains to be used as input for the trained deep learning classifier, similar to the process described above with respect to the training waveform data. In some embodiments, this processing involves combining time-domain inputs from multiple detectors to improve the accuracy of signal identification.

In some embodiments, applying the trained deep learning classifier involves feeding the waveform data as input into the classifier, and leveraging the learned features and decision-making capabilities of the trained classifier to identify candidate GW signals. In some embodiments, the classifier processes the data and assigns probabilities or scores to each waveform indicating the likelihood of the waveform being a candidate GW signal. By applying the deep learning classifier to the second set of waveform data, GW signals may be identified that may otherwise have been missed or not adequately identified by traditional detection methods. The classifier can leverage its ability to learn complex patterns and correlations in the data to distinguish true GW signals from noise or other sources of interference. In some embodiments, the identification of candidate GW signals in the second set of waveform data opens up possibilities for further analysis and validation. These candidate signals can undergo additional scrutiny and testing to confirm their authenticity. In some embodiments, various criteria, such as, for example, signal significance, compatibility with known GW events, or agreement between multiple detectors, can be used to refine the selection and prioritize the most promising candidates.

At step 240, the system generates an SNR ranking statistic from the output of the trained deep learning classifier. This SNR ranking statistic separates the distribution of signal-like outliers from those of noise sources, thus serving as a quantitative measure of the strength or significance of the identified GW signals relative to the background noise.

In some embodiments, to generate the SNR ranking statistic, each candidate signal's output from the deep learning classifier is evaluated and assigned an SNR value. The SNR value represents the ratio of the signal amplitude to the standard deviation of the background noise. Higher SNR values indicate stronger and more distinguishable signals, while lower SNR values suggest weaker or more ambiguous signals. The SNR ranking statistic provides a systematic way to prioritize and rank the identified GW signals based on their significance. By sorting the candidate signals in descending order of their SNR values, one can identify the most prominent and statistically significant signals in the dataset.

In some embodiments, a pre-specified minimum SNR threshold may be employed to establish a desired level of confidence or significance for accepting a signal as a valid detection. Signals with SNR values above the threshold are considered more reliable and may be prioritized in an SNR ranking for further analysis or follow-up observations.

In some embodiments, the SNR ranking statistic also aids in distinguishing between true signals and potential false positives. By comparing the SNR values of the candidate signals to a background distribution, it becomes possible to assess the likelihood of a signal being a true GW event. Signals with higher SNR values that deviate significantly from the background noise distribution are more likely to be genuine GW signals.

In some embodiments, the SNR ranking statistic is generated by analyzing the probability scores outputted by the trained deep learning classifier. In some embodiments, the system applies a logarithmic transformation to the probability scores to mitigate potential saturation or compression at extreme values. This transformation helps maintain a proportional relationship between the scores and the actual signal strength, enabling better discrimination between strong and weak signals. After the transformation, the resulting values are used as the basis for computing the SNR ranking statistic. Signals with higher transformed probability scores correspond to larger SNR values, indicating a higher likelihood of being genuine GW signals.

In some embodiments, the SNR ranking statistic is calculated by applying a function to the raw output of the deep learning classifier, the function being selected to preserve the sample ranking and provide an SNR interpretation for the identified GW signals. In some embodiments, the raw output of the deep learning classifier, which may be referred to as the logit l, represents the classification score assigned to each sample. These classification scores indicate the likelihood that a given waveform belongs to either the GW signal class or the background noise class. However, these raw scores may not directly correspond to an SNR interpretation, and further processing is required to obtain a meaningful SNR ranking. To achieve this, a function is applied to the logits that maps them to a transformed space. This function preserves the relative ranking order of the samples, and ensure that samples with higher scores in the raw output receive higher SNR rankings in the transformed space. In various embodiments, different functions can be considered for this transformation, depending on the specific requirements and characteristics of the deep learning classifier and the desired SNR interpretation. For example, a logarithmic function may be used to compress the range of the scores and emphasize the differences between higher scores. Alternatively, a linear or power function may be employed to preserve the linear relationship between the scores and the SNR rankings.

At step 250, the system determines SNR rankings of the candidate GW signals using the generated SNR ranking statistic. In some embodiments, to determine the SNR rankings, the generated SNR ranking statistic is analyzed, and the candidate GW signals are sorted in descending order based on their respective SNR values. GW signals with higher SNR rankings are considered to have stronger signal content and higher statistical significance.

In some embodiments, the SNR rankings are determined by applying a threshold to the SNR ranking statistic, requiring a minimum value to be considered as a candidate. This threshold serves to establish a minimum requirement for the SNR ranking, ensuring that only signals surpassing a certain significance level are included in the final ranked output described in later steps.

At step 260, the system evaluates the compatibility between candidate GW signals from different detectors. In some embodiments, this evaluation is performed by comparing arrival times and parameters of the candidate GW signals. In some embodiments, the system first compares the arrival times of the candidate GW signals recorded by different detectors. By examining the time differences, it can determine if the signals exhibit a consistent arrival pattern across the detectors. Inconsistencies in arrival times may suggest noise or false positives in the data, which need to be carefully evaluated and filtered out. In some embodiments, the system additionally compares the parameters of the candidate GW signals, such as, e.g., their amplitudes, frequencies, and waveforms. This analysis aims to verify if the signals exhibit similar characteristics across the detectors. In some embodiments, one or more statistical analysis and/or hypothesis testing techniques are employed to determine the likelihood that the observed similarities in arrival times and parameters could occur by chance.

In some embodiments, comparing the arrival times and parameters of the candidate waveforms involves comparing mass and/or spin characteristics of the candidate waveforms.

In some embodiments, the system analyzes the mass characteristics of the candidate waveforms. This involves examining the mass values associated with the detected waveforms and comparing them across different detectors. In some embodiments, the system also considers the spin characteristics of the candidate waveforms, such as, e.g., the magnitude and orientation, to further evaluate the compatibility of the candidate waveforms.

In some embodiments, evaluating the compatibility between signal candidate waveforms comprises running the identified signal candidates through a parameter regressor. In some embodiments, this is performed to determine one or more of: arrival times, best fit parameters, and associated confidence intervals of the waveforms from different detectors. In some embodiments, each satellite calibrates itself for a particular, precise location in space, which affects readings. If one satellite in the system moves out of alignment and is subsequently not properly accounted for, the readings are rendered inaccurate. Thus, the parameter regressor can be used to make sure the alignment of the satellites is correct in an accurate way. In some embodiments, the identified candidate GW signals are inputted into the parameter regressor. The parameter regressor is configured to analyze and extract key information from these waveforms, providing estimates for various parameters that are essential for evaluating their compatibility. One of the primary parameters of interest is the arrival time of the gravitational wave signals at each detector. By running the waveforms through the parameter regressor, the system can determine arrival times for each candidate waveform from different detectors. In some embodiments, the parameter regressor is additionally used to estimate the best fit parameters for the waveforms. These parameters represent the values that provide the closest match between the observed waveforms and the theoretical models.

At step 270, the system estimates a number of detection significance scores associated with the candidate GW signals by analyzing clusters of identified candidate GW signals that pass or fail the compatibility evaluation. In some embodiments, the estimated detection significance scores are used to determine the statistical significance of the identified gravitational wave signals.

In some embodiments, the estimation of detection significance scores involves analyzing the clusters of identified candidate GW signals that have passed or failed the compatibility evaluation. These clusters represent groups of waveforms that exhibit similar characteristics and are likely to arise from the same gravitational event. By examining the properties and patterns within these clusters, the system can calculate detection significance scores for each candidate GW signal. In some embodiments, these scores are derived based on statistical methods and algorithms that consider factors such as, e.g., the number of signals within a cluster, the consistency of their parameters, and the overall agreement between the waveforms.

In some embodiments, the identified gravitational wave signals are categorized into different signal classes based on their SNR ranking and detection significance score. This categorization can enable a systematic classification and characterization of the detected signals. By combining the SNR ranking and detection significance score, the system can create distinct signal classes. For example, the system may categorize the signals into classes such as "high SNR and high significance," "low SNR and high significance," "high SNR and low significance," and "low SNR and low significance." These classes may represent different levels of signal strength and statistical confidence associated with the detections.

At step 280, the system outputs at least a subset of the identified GW signals based on their SNR rankings and detection significance scores. In some embodiments, the output is provided to one or more client devices which are configured to receive information or notifications of identified GW signals. In some embodiments, only outputs that meet certain criteria, such as a minimum SNR ranking or detection significance score, may be output to particular client devices, depending on their configuration and preferences for output. In some embodiments, the outputted identified gravitational wave signals are each provided with a set of additional metadata. In various embodiments, this additional metadata may include one of more of: arrival times, localization in the sky, and/or estimated parameters.

In some embodiments, the deep learning classifier is updated and retrained periodically using a new set of labeled data to improve detection performance. In some embodiments, the new labeled data, consisting of both gravitational wave signals and background samples, is first collected or generated. The labeled data provides the ground truth information necessary for training the classifier. In various embodiments, this new labeled data may be the identified candidate GW signals from the current iteration or a previous iteration of the process. Next, the deep learning model is updated with the new data, which may involve adjusting its parameters, architecture, or both. After updating the deep learning model, the retraining process begins. In some embodiments, the updated model is trained on the combined dataset, which includes the previously labeled data and the new labeled data. In some embodiments, the training process involves presenting the waveform data to the model, which then learns to associate the features of the signals with their corresponding labels. In some embodiments, an optimization algorithm, such as the Adam optimizer, is used to iteratively adjust the model's parameters to minimize the loss function and improve its performance.

In some embodiments, the deep learning classifier is configured to enable real-time or near-real-time gravitational wave detection. The classifier can thereby be designed and optimized to process incoming data and make predictions in a timely manner, allowing for prompt identification of gravitational wave signals as they occur. In some embodiments, real-time GW detection is enabled by one or more pieces of additional machinery or equipment. In some embodiments, high-performance computing is employed to achieve real-time GW detection.

In one example application performed in accordance with some embodiments, the system uses the output candidate GW signals to estimate one or more of the size, location, or other attributes of an object associated with at least a subset of the identified GW candidate signals. This can be performed to ascertain valuable information about gravitational wave events and the sources responsible for generating them. In one example, the process can be used to detect gravitational anomalies in the Earth's atmosphere. In another example, the process can be used to detect various celestial objects and/or aerial objects, including, for example, small aerial objects. In yet another example, the process can be used to detect movements and shifts of plate tectonics. Such a process may be incorporated into a larger process for detecting earthquakes, for example.

In some embodiments, to estimate the size or location of the associated object, the system leverages various factors derived from the identified GW candidate signals. These factors may include one or more of, e.g., waveform characteristics, arrival times, signal strengths, and potentially other properties that can offer insights into the source's properties. In some embodiments, the size estimation involves determining the physical dimensions or characteristics of the object emitting the GW signals. This estimation can provide valuable information about, for example, the mass, energy, or structure of the source. In some embodiments, the location estimation aims to identify the spatial coordinates of the object relative to Earth or specific reference points (e.g., coordinates) in space. This information enables researchers to pinpoint the origin of the GW signals and trace them back to their source. By considering the arrival times of the signals at different detectors or employing triangulation techniques, the system can estimate the location of the object emitting the GW signals. In various embodiments, statistical modeling, deep learning techniques, or other techniques may be employed to analyze the identified candidate GW signals and derive estimates.

In another example in accordance with some embodiments, the system determines the location of a gravitational event associated with at least a subset of the identified candidate gravitational wave signals by triangulating the arrival times and parameters of the candidate waveforms from different detectors and comparing them to one or more sky maps or astrophysical models. By doing so, the system can perform a precise localization of the GW event. In some embodiments, the triangulation process begins with the system comparing the arrival times of the candidate waveforms from multiple detectors. The differences in arrival times can provide information about the distance between the detectors and the event location. By considering the known positions of the detectors, the system can calculate the arrival time differences and use them to narrow down the possible locations of the gravitational event.

In some embodiments, the system additionally takes into account the parameters of the candidate waveforms, such as, for example, the waveform shapes, frequencies, and other characteristics. These parameters can further refine the localization process by providing additional constraints on the event's position. By comparing the observed parameters with known astrophysical models or sky maps, the system can identify the most likely location of the gravitational event. Sky maps or astrophysical models contain information about the distribution of celestial objects, such as stars, galaxies, or other astrophysical sources. By comparing the observed parameters of the candidate waveforms to the features in the sky maps or models, the system can correlate the detected signals with specific regions of the sky and infer the location of the gravitational event.

In another example in accordance with some embodiments, the system utilizes a satellite-based laser interferometer system to triangulate the location or occurrence of a gravitational event associated with at least a subset of the identified candidate gravitational wave signals. In some embodiments, this satellite-based system consists of at least three satellites strategically positioned in space. In some embodiments, each satellite in the system is equipped with a laser interferometer, which measures the minute changes in the relative distances between the satellites. These measurements are crucial for precisely determining the location or occurrence of the gravitational event. By analyzing the interferometer data from the satellites, the system can extract valuable information about the GW signals and their sources.

In some embodiments, to triangulate the event location, the system utilizes the time delays in the arrival of the GW signals at each satellite. By comparing the arrival times and phase differences between the signals received by different satellites, the system can calculate the distances between the satellites and the event location. This information, combined with the known positions of the satellites, enables the system to triangulate the event location with high accuracy.

Figure 4:
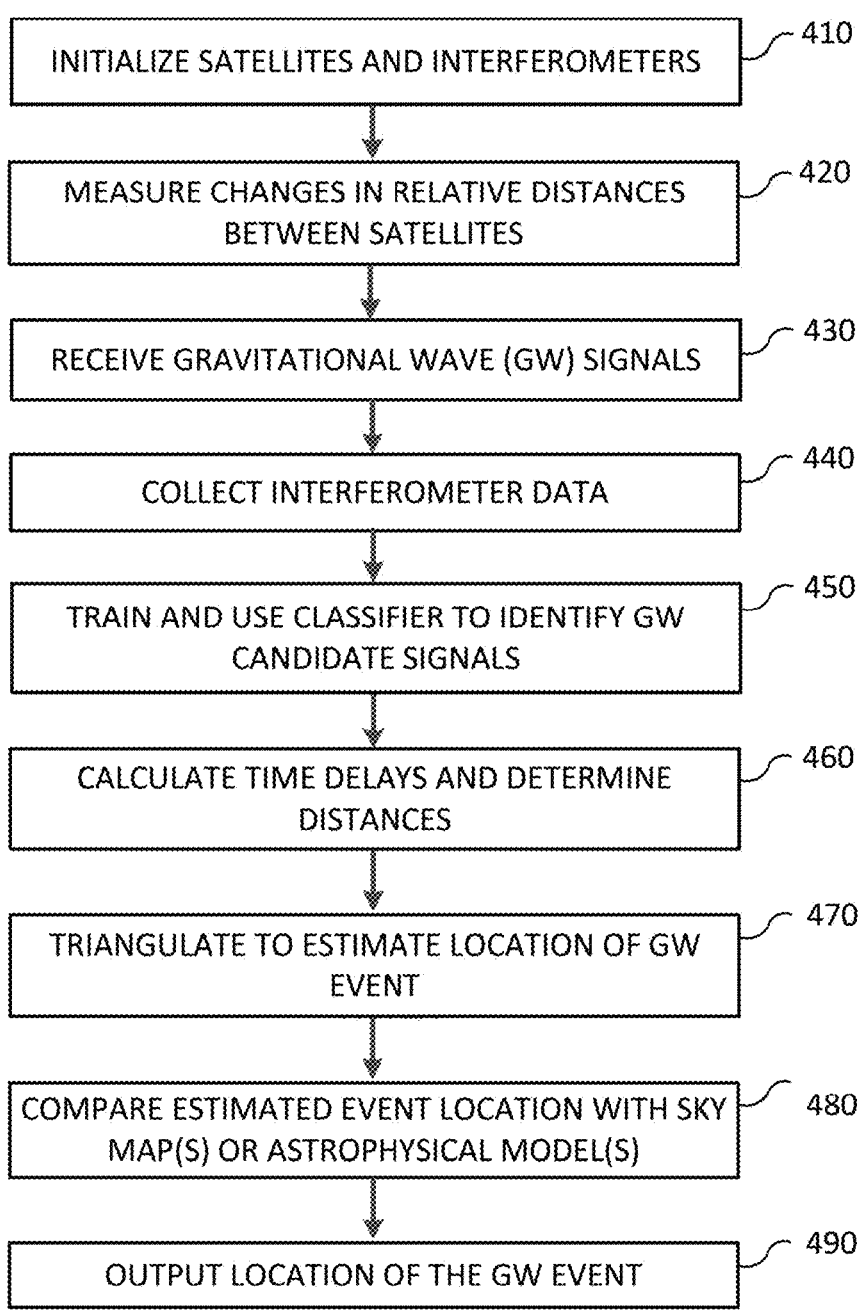
FIG. 4 is a flow chart illustrating a satellite-based laser interferometer system for triangulating the location or occurrence of a gravitational event associated with at least a subset of the identified candidate gravitational wave signals.

FIG. 4 is a flow chart illustrating a satellite-based laser interferometer system for triangulating the location or occurrence of a gravitational event associated with at least a subset of the identified candidate gravitational wave signals.

At step 410, the system initializes the satellites and interferometers. During this step, the system sets up and configures at least three satellites in space, ensuring they are properly positioned and synchronized for the interferometer measurements. In various embodiments, the system takes into account various factors such as, for example, orbital dynamics, celestial coordinates, and mission requirements to determine the optimal positions for the satellites. The system may further consider factors such as, for example, altitude, inclination, and orbital planes to achieve the desired configuration. The satellites are positioned in a way that allows for an effective triangulation of the gravitational event.

In some embodiments, once the positions are determined, the system initiates the deployment of the satellites into their respective orbits. This may involve, e.g., launch operations, propulsion maneuvers, and trajectory adjustments to position the satellites correctly. The satellites are equipped with the necessary instruments and equipment for laser interferometry, including, e.g., high-precision lasers, detectors, and communication systems. In some embodiments, the system additionally ensures that the satellites' internal clocks are precisely synchronized to a common reference time, which is crucial for accurate time measurements during interferometer operations. This synchronization allows for precise correlation of the measurements from each satellite, enabling accurate determination of time delays caused by gravitational waves.

At step 420, the system measures changes in the distances between the satellites. This involves monitoring and detecting any variations in the distances, which can provide valuable information needed for detection of gravitational wave events.

To measure the changes in distances, the system may utilize various techniques and technologies. In some embodiments, the system precisely measures the time it takes for laser beams to travel between the satellites. By accurately measuring the round-trip time of the laser beams, the system can determine the changes in distances between the satellites with high precision. In some embodiments, the system may employ advanced interferometry techniques to enhance the accuracy of the distance measurements. Interferometry involves the interference of two or more laser beams to create a pattern of light and dark fringes. By analyzing the interference pattern, the system can extract precise information about the changes in distances between the satellites. In some embodiments, the system may incorporate additional sensors or instruments to complement the distance measurement. For example, it may utilize accelerometers or gyroscopes to measure the relative motion or rotation of the satellites, which can further refine the distance calculations. In various embodiments, the measurements are performed continuously or at regular intervals to capture any dynamic changes in the distances.

At step 430, the system receives GW signals. In some embodiments, after initialization of the satellites, the satellites are configured to be actively engaged in capturing GW signals transmitted from detectors on Earth or other sources in space. These GW signals are generated by astrophysical events such as, for example, binary black hole mergers, neutron star collisions, or other cosmic phenomena. The detectors are capable of capturing the subtle changes in the relative distances between the satellites' components as the GW passes through the vicinity of the satellites.

At step 440, the system collects interferometer data. In some embodiments, the satellites' detectors receive and capture the incoming GW signals. The captured signals are then processed and analyzed to extract relevant information about the GWs. In various embodiments, this processing may involve, e.g., filtering out noise, enhancing the signal-to-noise ratio, and applying sophisticated algorithms to extract the underlying GW characteristics.

At step 450, the system trains and uses a deep learning classifier to identify candidate GW signals. The process involved in this step is described above with respect to FIG. 2B above.

At step 460, the system calculates time delays and determines distances between the satellites and the gravitational event location. First, the system calculates the precise time delays between the arrival of the GWs at each satellite. In some embodiments, by analyzing the captured GW signals and their timestamps, the system can accurately measure the differences in arrival times at each satellite. Then, using the calculated time delays, the system determines the distances between the satellites and the gravitational event location. In some embodiments, using the known speed of the GW signal propagation, the system leverages the measured time delays to infer the spatial separations between the satellites. In some embodiments, by multiplying the time delays by the speed of the GW signal, the system obtains the approximate distances traveled by the GWs from the event location to each satellite.

At step 470, the system applies triangulation techniques to determine the location of the gravitational event by analyzing the distance measurements from the satellites. In some embodiments, using the distance measurements between the satellites and the known positions of the satellites, the system constructs lines or vectors extending from each satellite towards the event location. These lines represent the distances and directions from the satellites to the event. The lines intersect at a specific point in space, which corresponds to the location of the gravitational event.

At step 480, the system compares the triangulated location of the GW event with one or more known sky maps and astrophysical models to validate and refine the estimation. This step allows the system to align the calculated location with existing astronomical knowledge and predictions. In some embodiments, by comparing the triangulated location of the gravitational event with the positions of known objects in the sky maps, the system can verify if the event aligns with any known astronomical sources or structures. In some embodiments, by comparing the triangulated location with astrophysical models, the system can assess whether the estimated event aligns with the expected patterns and characteristics of gravitational events based on current astrophysical understanding.

At step 490, the system outputs the determined location of the GW event. The outputted location represents the final output of the system's analyses and calculations, combining data from multiple satellites and triangulation techniques to pinpoint the probable origin of the gravitational event. The system provides a set of coordinates or spatial parameters that indicate where the event likely took place relative to Earth or other reference points in space. This output can be provided to one or more client devices configured to receive information or notifications about the determined locations of GW events.

In some embodiments, an additional, optional step involves subsequently identifying an object associated with at least a subset of the identified GW signals. In some embodiments, the previous steps can be used to determine an object's attributes, such as, e.g., the object's shape, velocity, mass, or other relevant attributes. Using these attributes, the system may identify the object.

Figure 5:
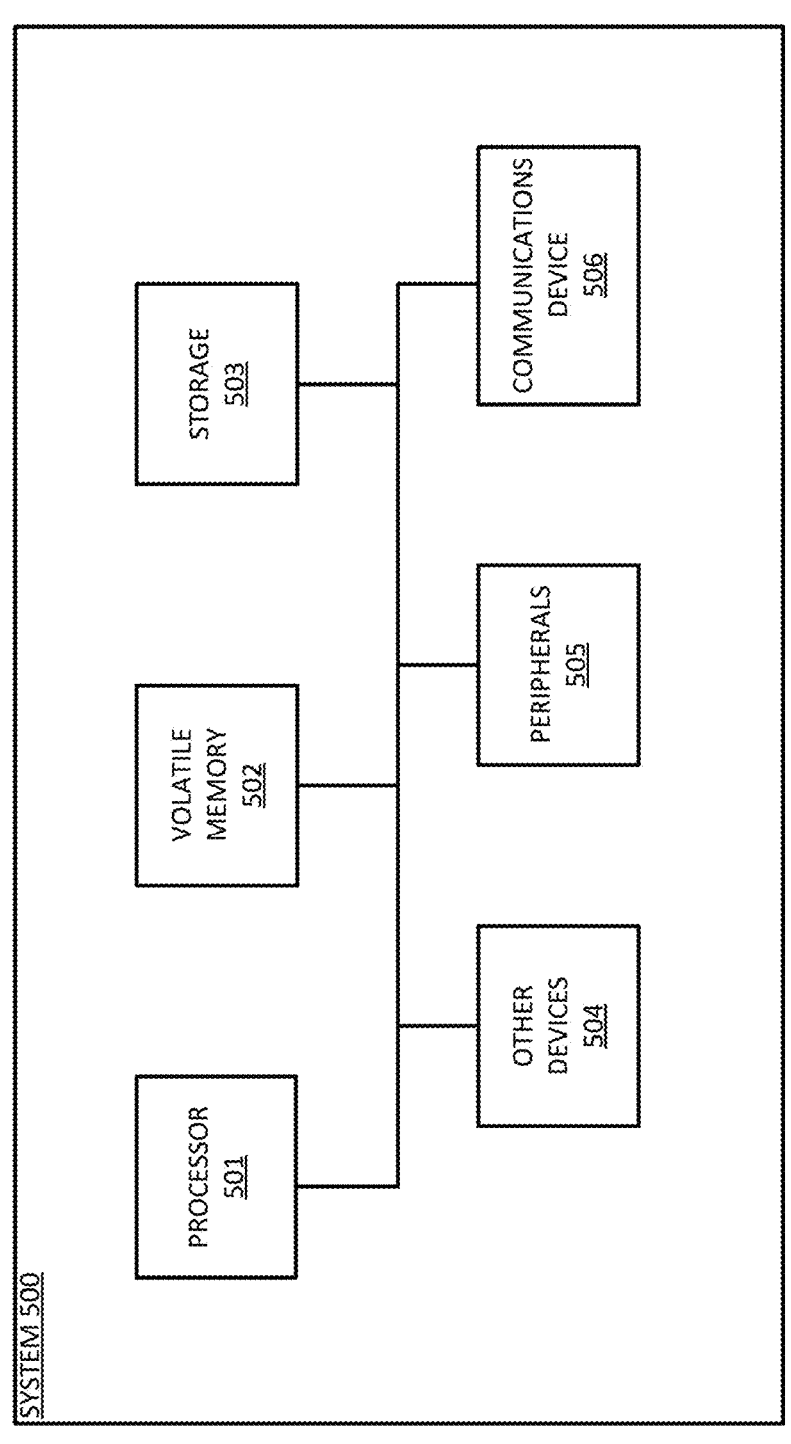
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for detection of gravitational waves, comprising:

training a deep learning classifier using a first set of waveform data from a first plurality of gravitational wave (GW) detectors;

positioning a second plurality of GW detectors about the Earth, each of the second plurality of GW detectors comprising components that detect gravitational wave signals;

receiving by each of the second plurality of GW detectors gravitational wave signals;

transmitting from each of the second plurality of GW detectors, waveform data representing the received gravitational wave signals;

combining time-domain inputs from multiple GW detectors of the second plurality of GW detectors to improve the accuracy of signal identification by aligning and synchronizing the waveform data transmitted from each of the second plurality of GW detectors;

applying the trained deep learning classifier to a second set of waveform data comprising the gravitational wave data transmitted from the second plurality of GW detectors to identify candidate GW signals;

generating a signal-to-noise ratio (SNR) ranking statistic from the output of the trained deep learning classifier;

determining SNR rankings of the candidate GW signals using the generated SNR ranking statistic;

evaluating the compatibility between candidate GW signals from different detectors by comparing arrival times and parameters of the candidate GW signals;

estimating a plurality of detection significance scores associated with the candidate GW signals by analyzing clusters of identified candidate GW signals that pass or fail the compatibility evaluation; and outputting at least a subset of the identified GW signals based on their SNR rankings and detection significance scores.

2. The method of claim 1, further comprising:

estimating at least one of the size or location of an object associated with at least a subset of the identified GW candidate signals relative to Earth or one or more coordinates in space.

3. The method of claim 1, wherein the deep learning classifier is based on a residual neural network (ResNet) convolutional neural network (CNN).

4. The method of claim 1, further comprising:

processing the gravitational wave data to remove noise and artifacts.

5. The method of claim 1, further comprising:

processing the first set of waveform data into time-domain waveform strains to be used as training data for the deep learning classifier; and processing the second set of waveform data into time-domain waveform strains to be used as input for the trained deep learning classifier, wherein the processing of the first and second sets of waveform data comprises combining time-domain inputs from multiple detectors to improve the accuracy of signal identification.

6. The method of claim 1, wherein training the deep learning classifier comprises using a dataset of simulated gravitational wave signals with realistic detector response, using a curated dataset comprising labeled gravitational wave signals and background samples, and/or minimizing the binary cross-entropy loss between a binary black hole (BBH) signal and background samples using an Adam optimizer.

7. The method of claim 1, wherein the SNR ranking statistic is calculated by applying a function to the raw output of the deep learning classifier, the function being selected to preserve the sample ranking and provide an SNR interpretation, and/or by applying a threshold to the SNR ranking statistic, requiring a minimum value to be considered as a candidate, wherein comparing the arrival times and parameters of the candidate waveforms comprises comparing mass and spin characteristics of the candidate waveforms.

8. The method of claim 1, wherein evaluating the compatibility between signal candidate waveforms comprises running the identified signal candidates through a parameter regressor to determine one or more of: arrival times, best fit parameters, and associated confidence intervals of the waveforms from different detectors, and wherein the identified gravitational wave signals are categorized into different signal classes based on their SNR ranking and detected significance score.

9. The method of claim 1, wherein the deep learning classifier is trained using a pre-trained supervised classifier to detect gravitational wave signals of unknown signal types, wherein the deep learning classifier is updated and retrained periodically using a new set of labeled data to improve detection performance, wherein the deep learning classifier is configured to enable real-time or near-real-time gravitational wave detection, and wherein the first and second sets of waveform data are each preprocessed by normalizing and standardizing the waveform data to enhance the performance of the deep learning classifier.

10. A system for detection of gravitational waves, comprising:

multiple GW detectors that are positioned about the Earth, each of the second plurality of GW detectors comprising components that detect gravitational wave signals, wherein the multiple GW detectors are configured to receive gravitational wave signals and transmit waveform data representing the received gravitational wave signals;

one or more processors and a memory storing instructions that, when executed by the one or more processors, cause the system to perform the operations of:

combining time-domain inputs from the multiple GW detectors to improve the accuracy of signal identification by aligning and synchronizing the waveform data transmitted from each of the multiple GW detectors;

training a deep learning classifier using a first set of waveform data from a first plurality of gravitational wave (GW) detectors;

applying the trained deep learning classifier to a second set of waveform data comprising the gravitation wave data transmitted from the multiple GW detectors to identify candidate GW signals;

generating a signal-to-noise ratio (SNR) ranking statistic from the output of the trained deep learning classifier;

determining SNR rankings of the candidate GW signals using the generated SNR ranking statistic;

evaluating the compatibility between candidate GW signals from different detectors by comparing arrival times and parameters of the candidate GW signals;

estimating a plurality of detection significance scores associated with the candidate GW signals by analyzing clusters of identified candidate GW signals that pass or fail the compatibility evaluation; and outputting at least a subset of the identified GW signals based on their SNR rankings and detection significance scores.

11. The system of claim 10, wherein the memory stores instructions that further cause the system to perform the operation of:

estimating at least one of the size or location of an object associated with at least a subset of the identified GW candidate signals relative to Earth or one or more coordinates in space.

12. The system of claim 10, wherein the deep learning classifier is based on a residual neural network (ResNet) convolutional neural network (CNN).

13. The system of claim 10, wherein the memory stores instructions that further cause the system to perform the operation of:

processing the gravitational wave data to remove noise and artifacts.

14. The system of claim 10, wherein the memory stores instructions that further cause the system to perform the operations of:

processing the first set of waveform data into time-domain waveform strains to be used as training data for the deep learning classifier; and processing the second set of waveform data into time-domain waveform strains to be used as input for the trained deep learning classifier, wherein the processing of the first and second sets of waveform data comprises combining time-domain inputs from multiple detectors to improve the accuracy of signal identification.

15. The system of claim 10, wherein training the deep learning classifier comprises using a dataset of simulated gravitational wave signals with realistic detector response, using a curated dataset comprising labeled gravitational wave signals and background samples, and/or minimizing the binary cross-entropy loss between a binary black hole (BBH) signal and background samples using an Adam optimizer.

16. The system of claim 10, wherein the SNR ranking statistic is calculated by applying a function to the raw output of the deep learning classifier, the function being selected to preserve the sample ranking and provide an SNR interpretation, and/or by applying a threshold to the SNR ranking statistic, requiring a minimum value to be considered as a candidate.

17. The system of claim 10, wherein comparing the arrival times and parameters of the candidate waveforms comprises comparing mass and spin characteristics of the candidate waveforms, wherein evaluating the compatibility between signal candidate waveforms comprises running the identified signal candidates through a parameter regressor to determine one or more of: arrival times, best fit parameters, and associated confidence intervals of the waveforms from different detectors, wherein the identified gravitational wave signals are categorized into different signal classes based on their SNR ranking and detected significance score, wherein the deep learning classifier is trained using a pre-trained supervised classifier to detect gravitational wave signals of unknown signal types, wherein the deep learning classifier is updated and retrained periodically using a new set of labeled data to improve detection performance, wherein the deep learning classifier is configured to enable real-time or near-real-time gravitational wave detection, and wherein the first and second sets of waveform data are each preprocessed by normalizing and standardizing the waveform data to enhance the performance of the deep learning classifier.

* * * * *